(12) United States Patent
Kojima et al.

(10) Patent No.: US 7,223,200 B2
(45) Date of Patent: May 29, 2007

(54) HYBRID-VEHICLE DRIVE SYSTEM AND OPERATION METHOD WITH A TRANSMISSION

(75) Inventors: Masakiyo Kojima, Susono (JP);
Toshifumi Takaoka, Susono (JP);
Yutaka Taga, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/261,411

(22) Filed: Oct. 2, 2002

(65) Prior Publication Data
US 2003/0078134 A1   Apr. 24, 2003

(30) Foreign Application Priority Data
Oct. 22, 2001 (JP) ............................. 2001-323578
Oct. 22, 2001 (JP) ............................. 2001-323931
Oct. 22, 2001 (JP) ............................. 2001-324064

(51) Int. Cl.
*B60K 1/02* (2006.01)
*F16H 3/72* (2006.01)
*F16H 37/06* (2006.01)
*F16H 35/02* (2006.01)
*F16H 37/12* (2006.01)

(52) U.S. Cl. ................. 477/3; 475/5; 475/15
(58) Field of Classification Search ............ 477/3, 477/15, 17, 20; 475/2, 4, 5, 208–219, 302, 475/343; 180/652, 65.6, 65.7
See application file for complete search history.

(56) References Cited

U.S. PATENT DOCUMENTS

| | | | |
|---|---|---|---|
| 3,623,568 A | 11/1971 | Mori | |
| 5,643,119 A | 7/1997 | Yamaguchi et al. | |
| 5,697,466 A | 12/1997 | Moroto et al. | |
| 5,775,449 A | 7/1998 | Moroto et al. | |
| 5,823,280 A * | 10/1998 | Lateur et al. | 180/65.2 |
| 5,842,534 A | 12/1998 | Frank | |
| 5,845,731 A * | 12/1998 | Buglione et al. | 180/65.2 |
| 5,895,333 A | 4/1999 | Morisawa et al. | |
| 5,904,631 A | 5/1999 | Morisawa et al. | |
| 5,935,040 A | 8/1999 | Tabata et al. | |
| 5,941,793 A | 8/1999 | Ito et al. | |
| 6,007,443 A | 12/1999 | Onimaru et al. | |
| 6,048,289 A * | 4/2000 | Hattori et al. | 477/15 |
| 6,098,733 A | 8/2000 | Ibaraki et al. | |
| 6,146,302 A | 11/2000 | Kashiwase | |
| 6,155,364 A | 12/2000 | Nagano et al. | |

(Continued)

FOREIGN PATENT DOCUMENTS

CN   1336879 A   2/2002

(Continued)

*Primary Examiner*—Tisha Lewis
(74) *Attorney, Agent, or Firm*—Oliff & Berridge, PLC

(57) ABSTRACT

A hybrid-vehicle drive method and system includes an internal combustion engine that includes an output shaft, a first electric motor/generator connected to the output shaft of the internal combustion engine via a power distribution mechanism, a wheel drive shaft connected to the output shaft of the internal combustion engine via the power distribution mechanism, a second electric motor/generator connected to the wheel drive shaft, and a transmission located on at least one of the wheel drive shaft and a connecting portion of the second electric motor/generator with the wheel drive shaft.

27 Claims, 9 Drawing Sheets

U.S. PATENT DOCUMENTS

| | | | |
|---|---|---|---|
| 6,203,468 B1 | 3/2001 | Nitta et al. | |
| 6,295,487 B1* | 9/2001 | Ono et al. | 701/22 |
| 6,371,878 B1 | 4/2002 | Bowen | |
| 6,371,882 B1* | 4/2002 | Casey et al. | 477/5 |
| 6,383,106 B1* | 5/2002 | Kashiwase | 475/5 |
| 6,416,437 B2* | 7/2002 | Jung | 475/8 |
| 6,455,947 B1* | 9/2002 | Lilley et al. | 290/40 C |
| 6,478,705 B1* | 11/2002 | Holmes et al. | 475/5 |
| 6,491,599 B1* | 12/2002 | Schmidt | 475/5 |
| 6,516,253 B2 | 2/2003 | Boggs et al. | 701/20 |
| 6,551,208 B1* | 4/2003 | Holmes et al. | 475/5 |
| 6,554,736 B2 | 4/2003 | Takano et al. | |
| 6,570,265 B1* | 5/2003 | Shiraishi et al. | 290/40 C |
| 6,656,069 B2* | 12/2003 | Sugano | 474/28 |
| 6,726,592 B2* | 4/2004 | Kotani | 477/4 |
| 6,740,002 B1 | 5/2004 | Stridsberg | |
| 6,886,648 B1 | 5/2005 | Hata et al. | |
| 2001/0016165 A1* | 8/2001 | Shimabukuro et al. | |
| 2002/0094898 A1 | 7/2002 | Hata et al. | |
| 2003/0178953 A1* | 9/2003 | Tumback et al. | 318/8 |

FOREIGN PATENT DOCUMENTS

| | | |
|---|---|---|
| DE | C 198 03 160 | 5/1999 |
| DE | 19903936 A1 * | 5/2000 |
| EP | 0 925 981 A2 | 6/1999 |
| EP | 1 055 545 A2 | 11/2000 |
| EP | 1 145 896 A1 | 10/2001 |
| EP | 11143134 A1 * | 10/2001 |
| JP | 47-31773 | 8/1972 |
| JP | S50-0300223 | 3/1975 |
| JP | A S61-286657 | 12/1986 |
| JP | A H06-080048 | 2/1994 |
| JP | A H07-096759 | 4/1995 |
| JP | A H09-117008 | 5/1997 |
| JP | A H09-226392 | 9/1997 |
| JP | A H09-292016 | 11/1997 |
| JP | A H10-037776 | 2/1998 |
| JP | A H10-341503 | 12/1998 |
| JP | A 11-198669 | 7/1999 |
| JP | A 2000-002327 | 1/2000 |
| JP | A-2000-245013 | 9/2000 |
| JP | A 2000-295709 | 10/2000 |
| JP | A 2000-324615 | 11/2000 |
| JP | A 2000-346187 | 12/2000 |
| JP | A 2001-206087 | 7/2001 |
| JP | A 2001-231107 | 8/2001 |

* cited by examiner

HYBRID-VEHICLE DRIVE SYSTEM AND OPERATION METHOD WITH A TRANSMISSION

INCORPORATION BY REFERENCE

The disclosure of Japanese Patent Applications Nos. 2001-323578, 2001-323931 and 2001-324064 filed on Oct. 22, 2001, each including the specification, drawings and abstract, is incorporated herein by reference in its entirety.

BACKGROUND OF THE INVENTION

1. Field of Invention

The invention relates to a drive system for hybrid vehicles, which drives wheels by using a combination of an internal combustion engine and electric motors.

2. Description of Related Art

As conservation of air environment and saving of fuel resources become increasingly important, hybrid vehicles whose wheels are driven by a combination of an internal combustion engine and an electric motor (or motors) have been attracting much attention in the field of automobiles. In the hybrid vehicles, wheels are driven in various manners by an internal combustion engine and an electric motor (or motors) arranged in various forms so as to achieve a wide variety of combinations of rotation speed and drive torque. Motor vehicles used to be driven by using only internal combustion engines. However, the development of hybrid vehicles in the automotive field was started by replacing a part of a drive system that conventionally uses only an internal combustion engine, with an electric drive system including, for example, an electric motor(s).

With this background, it is presently assumed that hybrid vehicles are capable of running only by use of an internal combustion engine. Japanese Laid-open Patent Publication No. 11-198669 discloses one example of a hybrid-vehicle drive system. In this hybrid-vehicle drive system, a first electric motor/generator is connected in series with a crankshaft of an internal combustion engine and a power shaft is arranged to be driven by one or both of the internal combustion engine and the first electric motor/generator serving as a motor. The power shaft and an output shaft of a second electric motor/generator are respectively connected to a ring gear and a sun gear of a planetary gear mechanism, thereby connecting both shafts to each other. A carrier of the planetary gear mechanism, which serves as an output shaft, is connected to a transmission, which in turn is connected to drive wheels. In the hybrid-vehicle drive system thus constructed, even when only the internal combustion engine operates as a driving motor, the drive system is able to provide a wide variety of operating or running modes required by the vehicle by utilizing the speed-ratio changing function of the transmission, as is the case with conventional vehicles using only the internal combustion engine. This may be considered as one typical example reflecting the origin of hybrid vehicles as described above.

On the other hand, there has been proposed another hybrid-vehicle drive system that eliminates the need of providing a transmission which was conventionally disposed between an output shaft of an internal combustion engine and a transmission. In this hybrid-vehicle drive system, an internal combustion engine and an electric motor (or motors) are combined to provide a driving source of a motor vehicle such that the motor serves to absorb a difference between the rotation speed of an output shaft of the internal combustion engine and that of vehicle axles. The difference is caused by deviation of the relationship between the rotation speed and the drive torque actually obtained by the internal combustion engine from that relationship required at the vehicle axles. FIG. 1 is a view schematically showing a construction of such a hybrid-vehicle drive system.

In FIG. 1, an internal combustion engine 1 is mounted in a vehicle body (not shown), and has an output shaft (or a crankshaft) 2. A planetary gear mechanism 3 includes a sun gear 4, a ring gear 5, planetary pinions 6, and a carrier 7. The crankshaft 2 is coupled to the carrier 7. A first electric motor/generator (MG1) 8 includes a coil 9 and a rotor 10. The rotor 10 is connected to the sun gear 4 while the coil 9 is supported on the vehicle body. One end of a propeller shaft 11 is connected to the ring gear 5. In the drive system thus constructed, the planetary gear mechanism 3 is operable to distribute power received from the internal combustion engine to the first motor/generator 8 and the propeller shaft 11 as a wheel-drive shaft. Thus, the planetary gear mechanism 3 serves as a power distribution mechanism. A second electric motor/generator (MG2) 12 is connected to an intermediate portion of the propeller shaft 11. The second motor/generator 12 includes a coil 13 and a rotor 14. The coil 13 is supported on the vehicle body. The rotor 14 may be connected to the propeller shaft 11 in any manner. In the drive system as shown in FIG. 1, for example, the rotor 14 is connected to the propeller shaft 11 such that a gear 16 supported and rotated by the rotor 14 engages with a gear 15 provided on the propeller shaft 11. The other end of the propeller shaft 11 is connected to a pair of vehicle axles 18 via a differential gear unit 17. Wheels 19 are attached to the respective vehicle axles 18.

In the drive system shown in FIG. 1, the crankshaft 2 rotates as a unit with the carrier 7, and the rotation speed of these components 2, 7 is denoted by "Nc." Likewise, the electric motor/generator 8 rotates as a unit with the sun gear 4, and the rotation speed of these components 8, 4 is denoted by "Ns." The ring gear 5, the second electric motor/generator 12, and the wheels 19 rotate in proportion with each other, to eventually provide the vehicle speed. The rotation speeds of these components 5, 12, 19 differ depending on the ratio between the number of gear teeth of the gear 15 and that of the gear 16, the speed reducing ratio of the differential gear unit 17, and the tire radius. In the following description, however, the rotation speed of the ring gear 5 will be adopted as a typical speed representing those of the components 5, 12, 19 and will be denoted by "Nr", for the sake of simplicity and convenience.

FIG. 2 is a graph showing a relationship among the rotation speed Nc of the internal combustion engine and the rotation speeds Ns, Nr of the two electric motors MG1, MG2, which relationship is established on the basis of the principal of the planetary gear mechanism. In this graph, $\rho$ represents the ratio of the number of gear teeth of the sun gear to that of the ring gear ($\rho<1$). Since Nc is determined by the rotation speed of the internal combustion engine, and Nr is determined by the vehicle speed, Ns is determined according to the following expression (1), based on the engine speed and the vehicle speed:

$$Ns=(1+1/\rho)Nc-(1/\rho)Nr \qquad (1)$$

Besides, torques at the carrier, the sun gear, and the ring gear will be denoted as Tc, Ts, and Tr, respectively. These torques are in equilibrium with each other at the following ratio;

$$Ts:Tc:Tr=\rho/(1+\rho):1:1/(1+\rho) \qquad (2)$$

When any of these three elements, i.e., the carrier, the sun gear and the ring gear, generates or absorbs torque, torque is transferred among the elements until the above equilibrium is achieved.

In a hybrid vehicle including the drive system constructed as described above, the operations of the internal combustion engine, MG1, and MG2 are controlled by a vehicle operation control system (not shown) based on operation commands from an operator of the vehicle and the operating or running state of the vehicle. More specifically, the vehicle operation control system includes a microcomputer and is arranged to perform the following control. First, a target vehicle speed and a target wheel drive torque are calculated based on operation commands from the vehicle operator and the operating state of the vehicle detected by various sensors. At the same time, output current available at a power storage system or the quantity of electric power required for charging the power storage system are calculated based on the state of charge (SOC) of the power storage system. Using the results of these calculations, the vehicle operation control system further performs calculations to determine an appropriate operating mode of the internal combustion engine, including suspension or stop of the operation thereof, and an appropriate motor-operating/power-generating mode of each of the MG1 and the MG2. Using the results of these calculations, the vehicle operation control system controls the operations of the internal combustion engine, the MG1 and the MG2.

In the hybrid-vehicle drive system, the output shaft of the internal combustion engine is connected to the first electric motor/generator and to the wheel-drive shaft via the power distribution mechanism, and the second electric motor/generator is connected to the wheel-drive shaft, as described above. With this arrangement, as is apparent from FIG. 2, changes in the rotation speed Nc of the output shaft of the internal combustion engine, the rotation speed Nr corresponding to the vehicle speed, and the relationship between the rotation speeds Nc, Nr can be absorbed by the rotation speed Ns of the first electric motor/generator, and therefore these values Nc, Nr can be significantly changed. Thus, the hybrid-vehicle drive system does not require a transmission. More specifically, the relationship between Nc and Nr can be flexibly changed by adjusting or controlling the power distribution system, and it is therefore possible, for example, to operate the engine (Nc>0) even when the vehicle is at a stop (Nr=0), to stop the engine operation (Nc=0) while the vehicle is running forward (Nr>0), or to drive the vehicle (Nr<0) backward irrespective of whether the engine is operated or stopped (Nc≧0).

Since the rotation speed of the MG2 depends on the vehicle speed and the state of charge of the power storage system basically has no relationship with the vehicle speed, there is a great restriction to operating the MG2 as a power generator for charging the power storage system. Therefore, charging of the power storage system is carried out only by the MG1 whereas electric driving of the wheels is carried out only by the MG2. In the above-described hybrid-vehicle drive system including no transmission, therefore, the MG2 serving as a sole motor for driving the wheels needs to be large-sized in order to secure a satisfactory vehicle drive performance for generating large wheel-drive torque as needed even in a low-vehicle-speed region.

The above description will be more apparent from FIG. 3, which shows a coordinate system indicating a relationship between a required value of torque to be produced at the vehicle axles (which will be referred to as "vehicle-axle torque") and the vehicle speed. The relationship of FIG. 3 is obtained when the internal combustion engine of the vehicle is operated at a high fuel efficiency over a wide range of vehicle speed. In FIG. 3, line A represents the limit performance of the vehicle, which represents a desired relationship between the vehicle speed and the vehicle-axle torque, and a flat region denoted by B represents the vehicle-speed versus vehicle-axle-torque performance of the internal combustion engine operating at a high fuel efficiency. The remaining region denoted by C represents the vehicle-speed versus vehicle-axle-torque performance to be provided only by the MG2. To achieve the vehicle-speed versus vehicle-axle-torque performance of FIG. 3, the MG2 is required to have a sufficiently large size so as to produce a large torque at a low rotation speed.

It appears from FIG. 3 that the depth of the region C is considerably large as compared with the region B. The imbalance between the region C and the region B may lead to an imbalance in the size among the three driving sources, i.e., the internal combustion engine and the first and second motor/generators, in particular, an imbalance in the size between the engine and the second motor/generator. In view of this point, the hybrid-vehicle drive system without a transmission as described above may be desired to be further improved.

SUMMARY OF THE INVENTION

The invention provides a hybrid-vehicle drive system which includes (a) an internal combustion engine that includes an output shaft, (b) a first electric motor/generator connected to the output shaft of the internal combustion engine via a power distribution mechanism, (c) a wheel drive shaft connected to the output shaft of the internal combustion engine via the power distribution mechanism, (d) a second electric motor/generator connected to the wheel drive shaft, and (e) a transmission located on at least one of the wheel drive shaft and a connecting portion of the second electric motor/generator with the wheel drive shaft.

The motor/generator used herein functions as both an electric motor and a generator. The present invention relates to short-term vehicle driving performance of the hybrid vehicle drive system in which the output shaft of the internal combustion engine is connected to the first motor/generator and the wheel drive shaft via the power distribution mechanism and the second motor/generator is connected to the wheel drive shaft. In other words, the invention does not relate to long-term vehicle driving performance in connection with the relationship among driving of the hybrid vehicle by use of the engine, driving by the motor and the self-charging function of the generator. Therefore, both the first and second motor/generators may simply consist of motors so as to provide the intended effects of the invention. In actual vehicle drive systems, however, the second motor/generator must operate as an electric motor (but it may also operates as a generator), and therefore the first motor/generator needs to have a power generating function, to provide a vehicle drive system capable of operating for a long period of time. This need, however, has no relationship with the technical concept of the invention. Thus, the first and second motor/generator as indicated above may be electric motors having no power generating function.

As described above, in the hybrid-vehicle drive system in which the output shaft of the internal combustion engine is connected to the first motor/generator and the wheel drive shaft via the power distribution mechanism, the transmission is located on the wheel drive shaft or in a connecting portion of the second electric motor/generator with the wheel drive shaft. In an arrangement in which the transmission is located on a portion of the wheel drive shaft that is closer to the internal combustion engine than the connecting portion of the second motor/generator, if the drive system is required to generate high vehicle-axis torque at a low vehicle speed, the speed of rotation of the internal combustion engine is increased in relation to the vehicle speed by controlling the power distribution mechanism, and the speed reduction ratio of the transmission is increased so that the engine provides a larger portion of the required high vehicle-axis torque. Thus, the required high torque can be provided at a low vehicle speed while reducing the magnitude of torque that needs to be generated by the second motor/generator. In another arrangement in which the transmission is located on a portion of the wheel drive shaft that is remote from the internal combustion engine with respect to the connecting portion of the second motor/generator, the engine speed is increased in relation to the vehicle speed by controlling the power distribution mechanism, and the speed reduction ratio of the transmission is increased so that the internal combustion engine and the second motor/generator cooperate with each other to drive the vehicle wheels at the increased speed reduction ratio. Thus, the required high torque can be provided at a low vehicle speed while reducing the magnitude of torque that needs to be generated by the second motor/generator. If the transmission is located in a portion that connects the second motor/generator to the wheel drive shaft, the vehicle-axis torque produced by the second motor/generator is increased by increasing the speed reduction ratio irrespective of control of the power distribution mechanism. In this manner, the requirement for high torque at a low vehicle speed can be satisfied even if the second motor/generator does not have such a large size. Thus, the relationship of the vehicle speed and the vehicle-axis torque as indicated by line A in FIG. 3 can be established while constantly driving the vehicle at a high fuel efficiency while at the same time balancing the sizes of the internal combustion engine and the first and second motor/generators relative to each other.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF PREFERRED EMBODIMENTS

Figure 1:
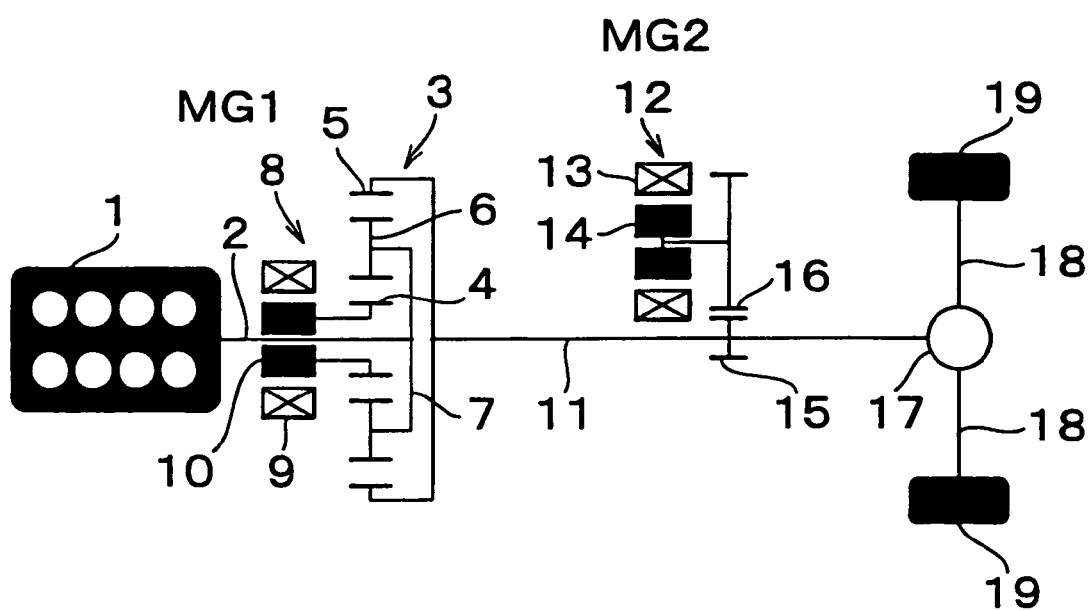
FIG. 1 is an exemplary view schematically showing a conventional hybrid-vehicle drive system.
Figure 4:
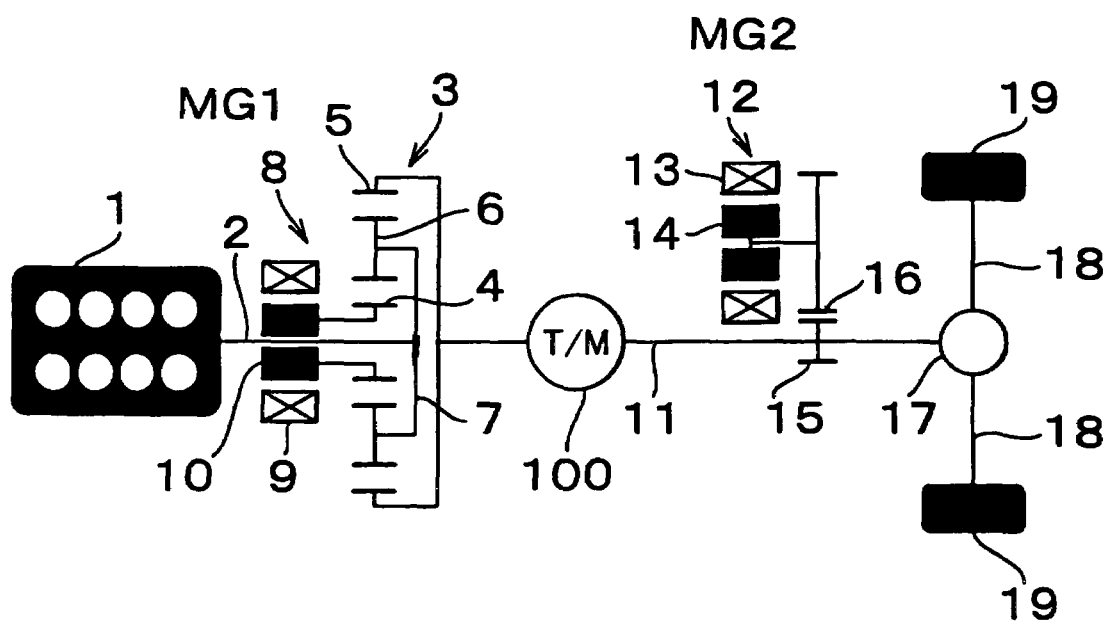
FIG. 4 is an exemplary view schematically showing a hybrid-vehicle drive system according to a first embodiment of the invention.
Figure 5:
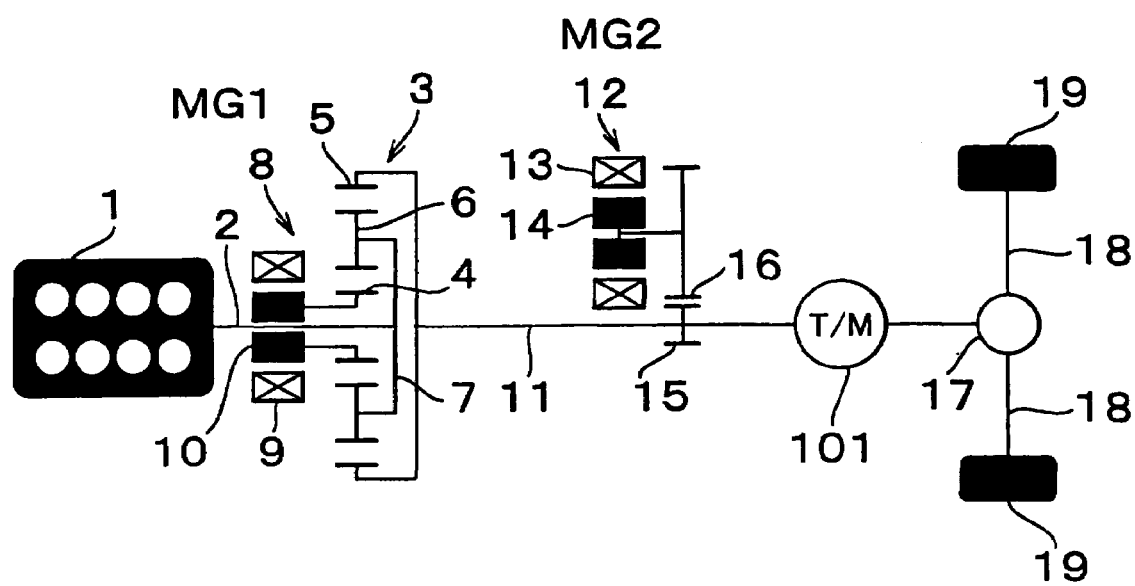
FIG. 5 is an exemplary view schematically showing a hybrid-vehicle drive system according to a second embodiment of the invention.
Figure 6:
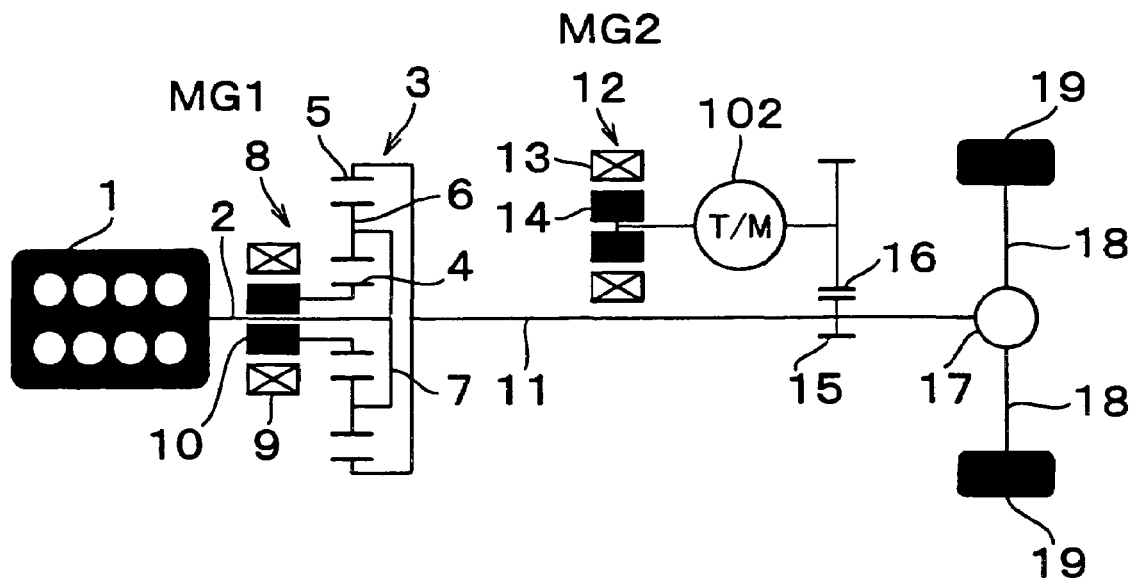
FIG. 6 is an exemplary view schematically showing a hybrid-vehicle drive system according to a third embodiment of the invention.

FIGS. 4–6 are schematic views showing three exemplary embodiments of the invention in which a transmission is incorporated in a hybrid-vehicle drive system where an output shaft of an internal combustion engine is connected to a first electric motor/generator and a wheel-drive shaft via a power distribution mechanism, and a second electric motor/generator is connected to the wheel-drive shaft. In FIGS. 4–6, elements that are the same as or equivalent to those shown in FIG. 1 are denoted by the same reference numerals and characters.

In a first embodiment shown in FIG. 4, a transmission 100 is disposed in an intermediate portion of the wheel-drive shaft at one side of a connecting portion of the second electric motor/generator MG2 closer to the internal combustion engine. In other words, the transmission 100 is disposed in a portion of the propeller shaft 11 as one part of the wheel-drive shaft, such that the transmission 100 is located on one side of the gear 15 that provides the connecting portion of the MG2, which side is closer to the internal combustion engine 1. The transmission 100 may have two or three gear ratios or gear positions, and may also have a reverse gear position. Such a transmission can be provided in various manners by using known techniques. An example of a transmission including three forward-drive gear positions and one reverse-drive gear position is schematically shown in FIG. 7.

Figure 7:
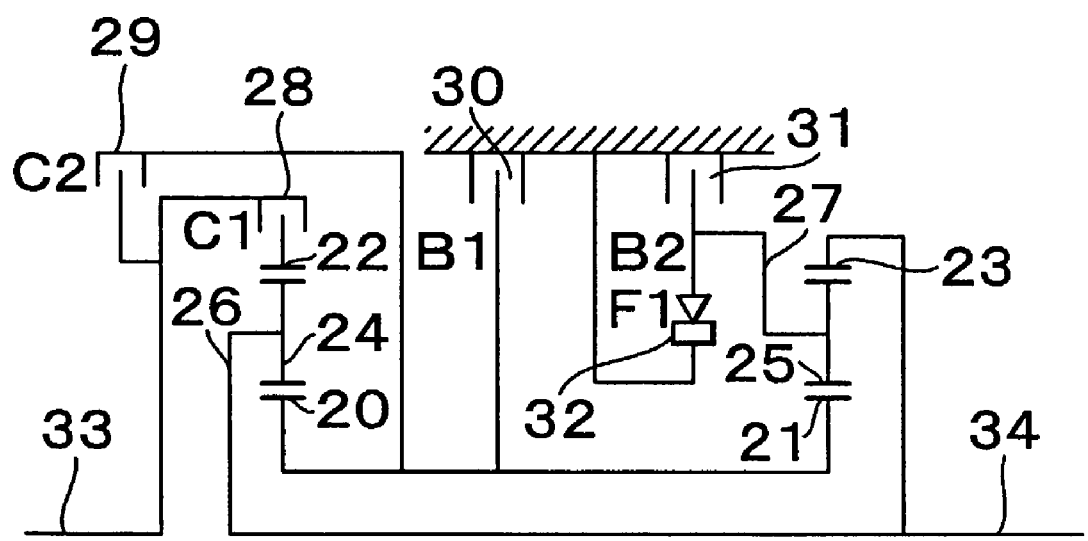
FIG. 7 is an exemplary view schematically showing a transmission having three gear ratios or positions and a reverse gear position.

In FIG. 7, reference numerals 20, 22, 24 and 26 denote a sun gear, a ring gear, planetary pinions, and a carrier of a planetary gear mechanism, and reference numerals 21, 23, 25 and 27 denote a sun gear, a ring gear, planetary pinions, and a carrier of another planetary gear mechanism. In addition, 28(C1) and 29(C2) are clutches, and 30(B1) and 31(B2) are brakes, while 32(F1) is a one-way clutch. These rotating elements are arranged together with an input shaft 33 and an output shaft 34 as shown in FIG. 7. In operation, the transmission 100 thus constructed is placed in the first gear position with the highest speed reducing ratio when the clutch C1 is engaged, and is placed in the second gear position with the middle speed reducing ratio when the clutch C1 and the brake B1 are engaged. The transmission 100 is also placed in the third gear position with the lowest speed reducing ratio (speed reducing ratio=1) when the clutches C1, C2 are engaged, and is placed in the reverse gear position when the clutch C2 and the brake B2 are engaged.

Figure 3:
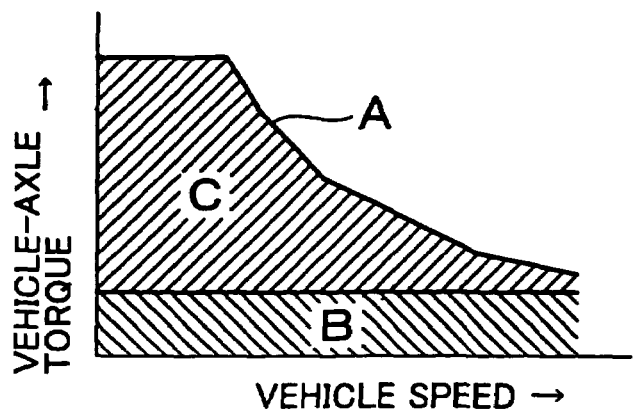
FIG. 3 is an exemplary graph showing a relationship between vehicle speed and the vehicle-axle torque to be produced by the internal combustion engine and the electric motor/generator in the hybrid-vehicle drive system shown in FIG. 1.
Figure 8:
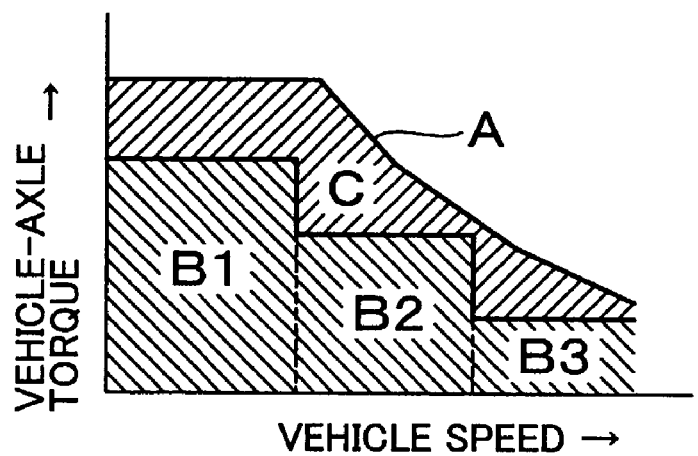
FIG. 8 is an exemplary graph showing a relationship between vehicle speed and the vehicle-axle torque to be produced by the internal combustion engine and the electric motor/generator in the hybrid-vehicle drive system shown in FIG. 4.

When a transmission having three gear positions is used as the transmission 100 in the drive system of the embodiment as shown in FIG. 4, the relationship (or ratio) between the torque to be produced by the internal combustion engine 1 and the torque to be produced by the MG2, when viewed in a vehicle-speed versus vehicle-axle-torque coordinate system, changes from that as shown in FIG. 3 (where no transmission is provided) to that as shown in FIG. 8. In FIG. 8, each of the regions B1, B2, and B3 represents the magnitude of vehicle-axle torque that can be mainly generated by the internal combustion engine (or the internal combustion engine and the MG1 in some cases) when the transmission is placed in the first gear position, second gear position and the third gear position. On the other hand, the remaining region C represents the magnitude of vehicle-axle torque required to be obtained by the MG2. It is to be noted that FIG. 8 is not a so-called shift diagram. For example, when the values of the vehicle speed and the required torque both fall in the region B1 in the coordinate system, this does not mean that the first gear ratio or position of the transmission 100 is established. It will be understood from FIG. 8 that the maximum torque required to be generated by the MG2 is significantly reduced as compared with FIG. 3.

In a second embodiment as shown in FIG. 5, a transmission 101 is disposed in an intermediate portion of the wheel-drive shaft on one side of the connecting portion of the second electric motor/generator MG2 remote from the internal combustion engine. In other words, the transmission 101 is disposed in a portion of the propeller shaft 11 as one part of the wheel-drive shaft such that the transmission 101 is located on one side of the gear 15 that provides the connecting portion of the MG2, which side is remote from the internal combustion engine with respect to the connecting portion. The transmission 101 may have two or three forward-drive gear positions and may also have a reverse-drive gear position. The transmission 101 may be constructed as shown in FIG. 7.

Figure 9:
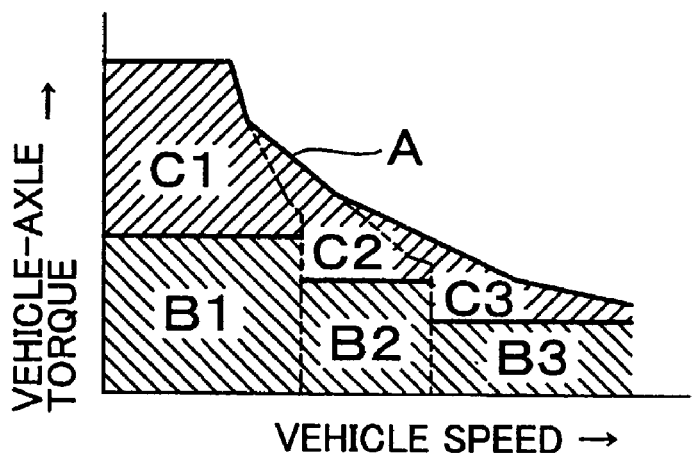
FIG. 9 is an exemplary graph showing a relationship between vehicle speed and the vehicle-axle torque to be produced by the internal combustion engine and the electric motor/generator in the hybrid-vehicle drive system shown in FIG. 5.

When a transmission having three gear positions is used as the transmission 101 in the driven system of the embodiment as shown in FIG. 5, the relationship (or ratio) between the torque to be produced by the internal combustion engine 1 and the torque to be produced by the MG2, when viewed in a vehicle-speed versus vehicle-axle-torque coordinate system, changes from that as shown in FIG. 3 (where no transmission is provided) to that as shown in FIG. 9. In FIG. 9, each of regions B1, B2, and B3 represents the magnitude of vehicle-axle torque that can be mainly generated by the internal combustion engine (or the internal combustion engine and the MG1 in some cases) when the transmission 101 is placed in the first gear position, second gear position and the third gear position. On the other hand, each of regions C1, C2, and C3 represents the magnitude of vehicle-axle torque required to be obtained by the MG2 when the transmission 101 is placed in the first gear position, second gear position and the third gear position. It will be also understood from FIG. 9 that the maximum torque required to be obtained by the MG2 is significantly reduced as compared with FIG. 3.

In a third embodiment shown in FIG. 6, a transmission 102 is disposed in a connecting line or path between the wheel-drive shaft and the second electric motor/generator MG2. In other words, the transmission 102 is disposed in a connecting portion of the MG2 that connects the MG2 with the propeller shaft 11 as a portion of the wheel drive shaft. The transmission 102 may have two or three gear ratios or positions. With the above arrangement, the transmission 102 need not have a reverse-drive gear position since the MG2 can be driven in the reverse direction by switching an electric circuit for the MG2. Nevertheless, the transmission 102 may have a reverse gear position, or may be constructed as shown in FIG. 7.

Figure 10:
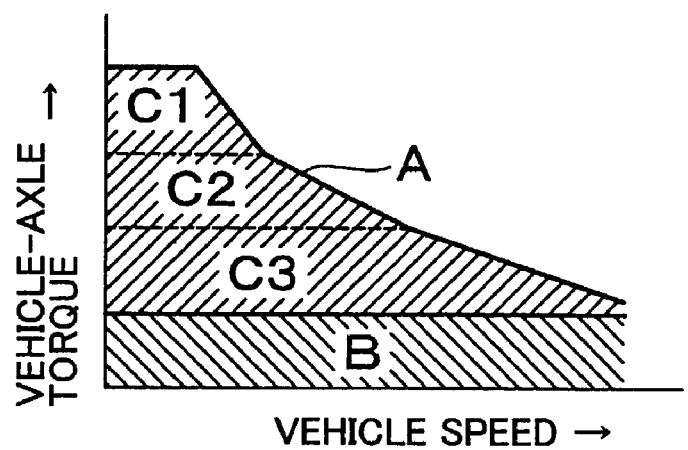
FIG. 10 is an exemplary graph showing a relationship between vehicle speed and the vehicle-axle torque to be produced by the internal combustion engine and the electric motor/generator in the hybrid-vehicle drive system shown in FIG. 6.

When a transmission having three gear positions is used as the transmission 102 in the embodiment shown in FIG. 6, the relationship (or ratio) between the torque to be produced by the internal combustion engine 1 and the torque to be produced by the MG2, when viewed in a vehicle-speed versus vehicle-axle-torque coordinate system, changes from that as shown in FIG. 3 (where no transmission is provided) to that as shown in FIG. 10. In FIG. 10, region B represents the magnitude of vehicle-axle torque that can be mainly produced by the internal combustion engine (or the internal combustion engine and the MG1 in some cases) irrespective of the current gear position of the transmission. On the other hand, region C3 represents the magnitude of vehicle-axle torque to be produced by the second electric motor/generator MG2 when the transmission 102 is in the third gear position. Region C2 represents the magnitude of the vehicle-axle torque to be produced by the second electric motor/generator MG2 in addition to the torque as represented by the region C3 when the transmission 102 is in the second gear position. Region C1 represents the magnitude of the vehicle-axle torque to be produced by the second electric motor/generator MG2 in addition to the torque as represented by the region C3 and the torque as represented by the region C2 when the transmission 102 is in the first gear position. In other words, the region C1 represents an increase in the magnitude of the torque that can be achieved by placing the transmission 102 in the first gear position. Similarly, the regions C2, C3 represent increases in the magnitude of the torque that can be achieved by placing the transmission 102 in the second gear position and the third gear position, respectively. It will be understood from FIG. 10 that the maximum torque required to be obtained by the MG2 is significantly reduced as compared with FIG. 3.

In the meantime, FIGS. 8–10 are not shift diagrams of the hybrid-vehicle drive system including the transmission, but are exemplary graphs showing the capability or performance of the drive system. Specifically, FIGS. 8–10 show the magnitude of the torque that can be mainly produced by the internal combustion engine (or the internal combustion engine and the MG1 in some cases) and the torque that can be provided by the second electric motor/generator MG2, in relation to the vehicle speed, as viewed in the vehicle-speed versus vehicle-axle-torque coordinate system. In the embodiments of FIG. 4 and 5, for example, the graphs of FIGS. 8 and 9 mean that the transmission is not always shifted from the first to the second gear position and from the second to the third gear position as the vehicle speed increases from a certain low speed to a certain high speed even if a required vehicle-axle torque is low. In these embodiments, when a large vehicle-axle torque is not required, such as when the vehicle normally starts running on a flat ground, the power distribution mechanism may be controlled so as to use only the region B of FIG. 3 while the transmission is held in the third gear position. In this case, the second and first gear positions of the transmission are used when the required vehicle-axle torque increases or when the shift lever is operated to the second drive position and the L position, respectively.

Figure 2:
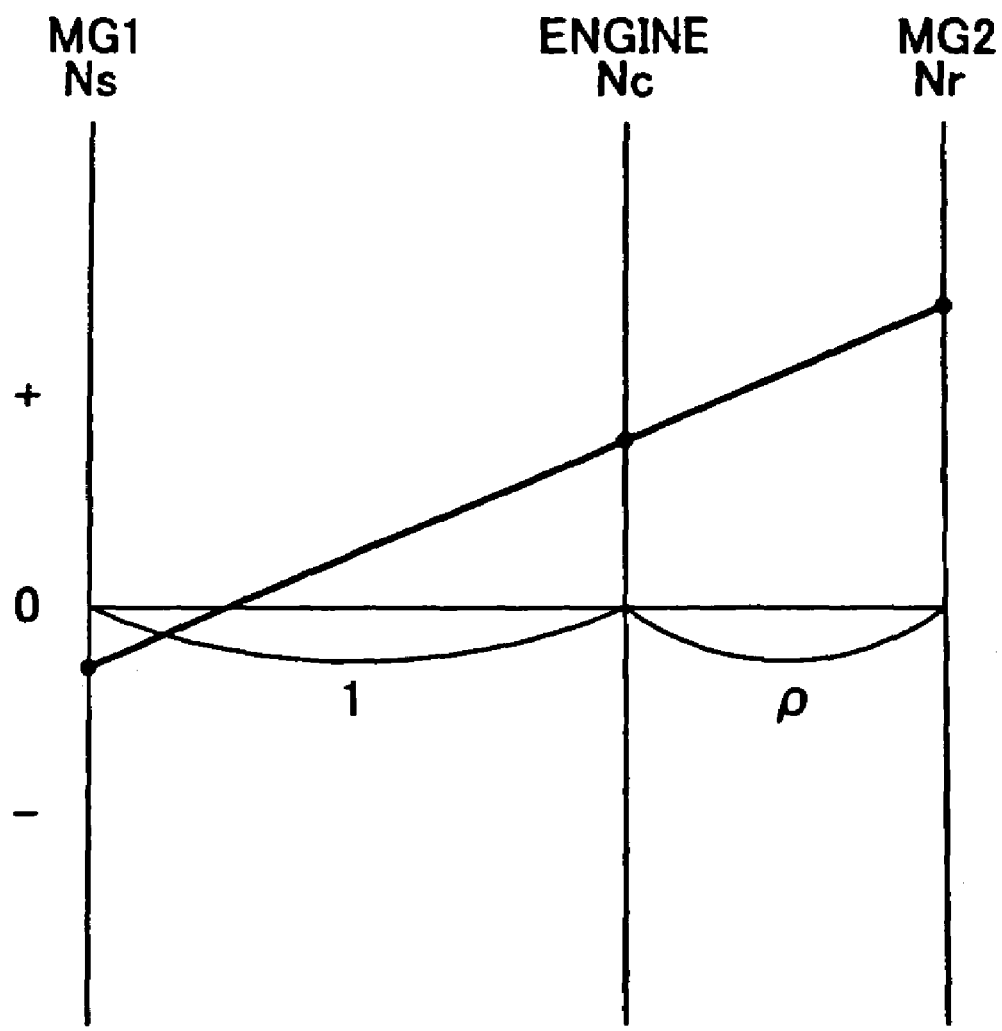
FIG. 2 is an exemplary graph showing a relationship among rotation speeds of an internal combustion engine and two electric motor/generators in the hybrid-vehicle drive system shown in FIG. 1.

In the above-illustrated embodiments, the value of Nr, as indicated in FIG. 2, is made negative when the vehicle runs in the reverse direction. Thus, the rotation speed Ns of the MG1 and the rotation speed Nr of the MG2 are adjusted in accordance with the rotation speed Nc of the internal combustion engine so that the rotation speed Nr becomes equal to a desired negative value, irrespective of whether the internal combustion engine is operating (Nc>0) or at a stop (Nc=0). Here, the rotation speeds of the MG1 and the MG2 can be quickly and continuously (or steplessly) adjusted. In this case, however, only the electric motor/generators are used to generate torque for driving the vehicle in the reverse direction, and the torque available from the motor/generators is greatly limited. In contrast, in the drive systems as shown in FIGS. 4 and 5 in which the transmission having a reverse gear position is disposed in an intermediate portion of the wheel-drive shaft, the internal combustion engine operates to drive the vehicle in the reverse direction with large driving torque when the transmission is placed in the reverse gear position, though some extra time is required for shifting the transmission. If there is provided a means for selecting a reverse driving mode from a first mode utilizing the reverse gear position of the transmission and a second mode utilizing adjustment of the power distribution mechanism, the vehicle may be more appropriately operated by selecting one of the first and second reverse driving modes depending upon the magnitude of torque required for driving the vehicle in the reverse direction. Meanwhile, the selecting means may be provided through software technology in recent computerized vehicle operation control systems.

Figure 11:
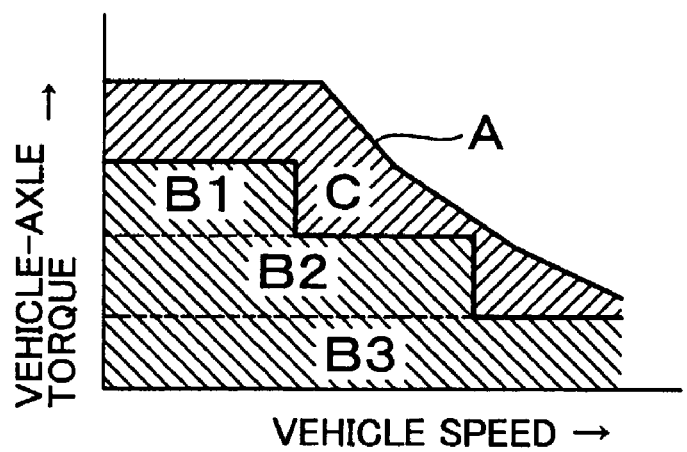
FIG. 11 is an exemplary graph showing a relationship between vehicle speed and the vehicle-axle torque to be produced by the internal combustion engine and the electric motor/generator in the hybrid-vehicle drive system shown in FIG. 4.
Figure 12:
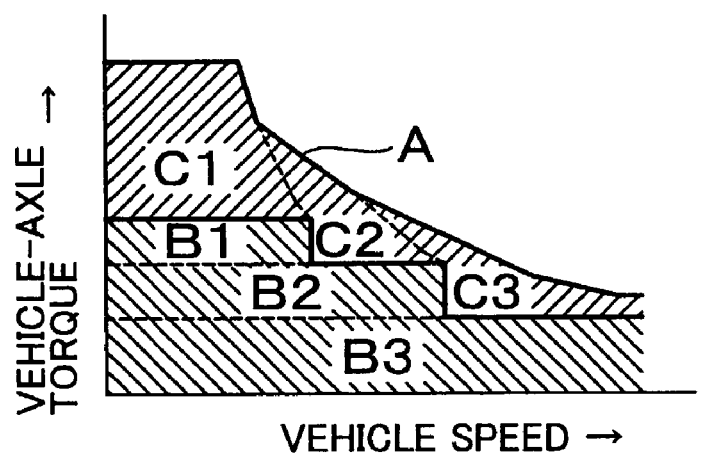
FIG. 12 is an exemplary graph showing a relationship between vehicle speed and the vehicle-axle torque to be produced by the internal combustion engine and the electric motor/generator MG2 in the hybrid-vehicle drive system shown in FIG. 5.

As modified examples of the above-illustrated embodiments, the hybrid-vehicle drive systems as shown in FIGS. 4 and 5 may be modified such that the internal combustion engine and the MG2 produce torque B1, B2, B3, C1, C2, and C3 in accordance with the gear position of the transmission, as indicated by vehicle-speed versus vehicle-axle torque coordinate systems of FIGS. 11 and 12, respectively, each indicating the required vehicle-axle torque in relation to the vehicle speed. More specifically, in either FIG. 11 or 12, the operable region defined by line A in the vehicle-speed versus vehicle-axle-torque coordinate system is divided by lines (boundaries) parallel to the vehicle-speed axis in accordance with the magnitude of the required vehicle-axle torque. In FIG. 11, when the transmission is in the third gear position, the vehicle-axle torque corresponding to the vehicle speed is provided with the magnitude corresponding to the sum of the regions B3 and C. When the transmission is in the second gear position, the vehicle-axle torque corresponding to the vehicle speed is provided with the magnitude corresponding to the sum of the regions B2, B3 and C. When the transmission is in the first gear position, the vehicle-axle torque corresponding to the vehicle speed is provided with the magnitude corresponding to the sum of the regions B1, B2, B3 and C.

Also, in FIG. 12, when the transmission is placed in the third gear position, the vehicle-axle torque corresponding to the vehicle speed is provided with the magnitude corresponding to the sum of the regions B3 and C3. When the transmission is in the second gear position, the vehicle-axle torque corresponding to the vehicle speed is provided with the magnitude corresponding to the sum of the regions B2, B3, and C2. When the transmission is in the third gear position, the vehicle-axle torque corresponding to the vehicle speed is provided with the magnitude corresponding to the sum of the regions B1, B2, B3 and C1. With this arrangement, as long as the required vehicle-axle torque is not so high, the difference between the rotation speed of the internal combustion engine and the vehicle speed is adjusted by using the power distribution mechanism rather than by shifting the transmission, and the transmission is used in aid of the power distribution mechanism to increase the torque only when the required vehicle-axle torque becomes high.

It is, however, to be understood that the hybrid-vehicle drive systems as shown in FIG. 4 and FIG. 5 may be operated according to shift maps as shown in FIG. 8 and FIG. 9, respectively. For example, if the hybrid vehicle is designed to be operated in a normal driving mode or a sporty driving mode, which is selected depending upon the preferences of the driver or the roughness of a road surface on which the vehicle is running. When the vehicle is in the normal driving mode, the hybrid-vehicle drive system may operate according to the shift map of FIG. 11 or 12. When the vehicle is in the sporty driving mode, the hybrid-vehicle drive system may operate according to the shift map of FIG. 8 or 9.

A control for shifting the transmission constructed as shown in FIG. 7 among the first, second, and third gear positions through engagement and disengagement of the clutches C1, C2 and the brakes B1, B2 may be performed by means of a known vehicle operation control system (not shown) that includes a microcomputer and is arranged to control the operation of the vehicle based on operation commands from a vehicle operator and signals from various sensors for detecting operating conditions of the vehicle. If the vehicle-axle-torque distribution maps as shown in FIG. 8 or 9 and FIG. 11 or 12 are provided, the transmission may be easily operated according to a selected one of these maps.

Also, when the hybrid-vehicle drive system as shown in FIG. 4 or 5 is operated under control of such a vehicle operation control system in accordance with the vehicle-axle torque distribution map as shown in FIG. 11 or 12, the transmission may be inhibited from being shifted to the next gear position for a predetermined time when shifting of the transmission is required according to the map.

As is understood from the construction of the hybrid-vehicle drive system including the internal combustion engine, the MG1 and the MG2 which are combined by means of the planetary gear mechanism, when the required vehicle-axle torque suddenly increases while the internal combustion engine is running at a constant power level the required vehicle-axle torque thus increased can be provided by increasing the power of at least one of the MG1 or MG2, rather than increasing the output torque to drive axles by shifting the transmission to a low-speed gear position. In this case, however, if the required value of the vehicle-axle torque increases in a way to induce a transition from the region B3 to the region B2 or from the region B2 to the region B1, it is preferable to increase the vehicle-axle torque by shifting the transmission to ensure that the MG1 and the MG2 operate under a rated load. In other words, if the power of the MG1 or MG2 is increased to increase the vehicle-axle torque in the case as described above, the MG1 or MG2 may undesirably operate at a power level greater than the rated power. However, the MG1 or MG2 may be allowed to operate under a load greater than the rated power only for a predetermined period of time.

Accordingly, when the required value of the vehicle-axle torque increases in a way to induce a transition from the region B3 to the region B2, at least one of the MG1 and the MG2 is operated to increase the vehicle-axle torque, instead of shifting the transmission, until a predetermined period of time elapses. With this arrangement, frequent shifting of the transmission due to temporary or momentary increases in the required value of the vehicle-axle torque can be prevented, thus permitting more smooth and quiet operation of the hybrid-vehicle drive system. The operation of the above-described hybrid-vehicle drive systems may be easily controlled by using a vehicle operation control system known in the art. Thus, any particular control sequence or flowchart for carrying out the above control will not be described herein.

Figure 13:
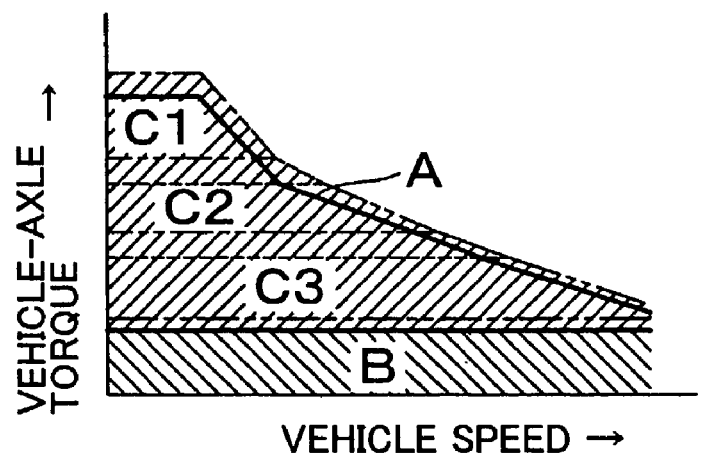
FIG. 13 is an exemplary graph showing the relationship in FIG. 10 which is corrected according to another embodiment of the invention.
Figure 14:
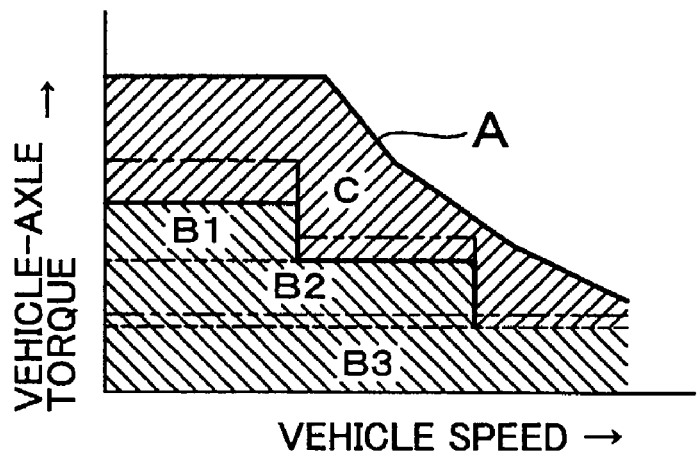
FIG. 14 is an exemplary graph showing the relationship in FIG. 11 which is corrected according to another embodiment of the invention.
Figure 15:
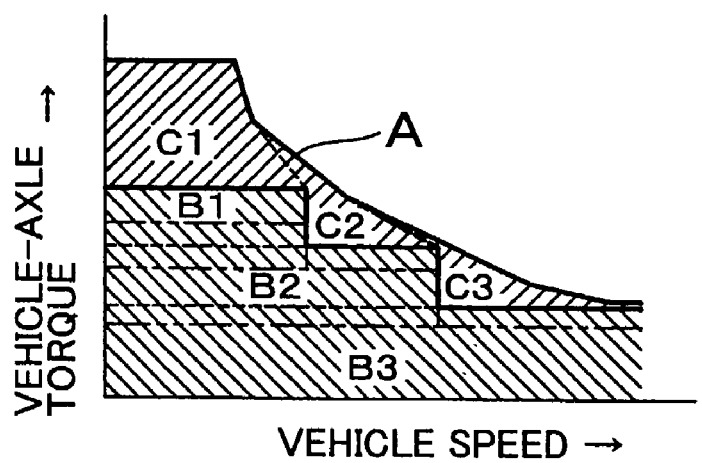
FIG. 15 is an exemplary graph showing the relationship in FIG. 12 which is corrected according to another embodiment of the invention.

As a further modified example of the above-illustrated embodiment, the ratio of the torque regions set for the internal combustion engine and the second motor/generator may be corrected in the event of a failure or an abnormality in the operation of the internal combustion engine or the second motor/generator. FIGS. 13–15, which correspond to FIGS. 11–13, respectively, illustrate examples of torque distribution maps used for torque control when the internal combustion engine or the second motor/generator is faulty and the output power of the engine or motor is reduced. In FIGS. 13–15, two-dot chain lines represent the original boundary lines.

FIG. 13 is a graph showing one example where the power of the second electric motor/generator MG2 is reduced to be lower than a normal level. In this example, the drive system is constructed such that only the output of the second motor/generator is directly affected by changing of the gear position (i.e., shifting) of the transmission. In the event of such a decrease in the power of the second electric motor/generator MG2, therefore, the shift control of the transmission, on one hand, is corrected so as to shift down the transmission at an earlier time than normal with respect to the vehicle speed, so as to reduce a torque load on the second motor/generator for each gear position of the transmission. On the other hand, the operation of the power distribution mechanism may be corrected by increasing the width of the region B, so as to cause the internal combustion engine to generate a larger magnitude of the vehicle-axle torque.

FIG. 14 is a graph showing one example where the power of the internal combustion engine is reduced to be lower than a normal level. In this example, the shift control of the transmission is corrected so as to reduce the vehicle-axle torque to be produced by the internal combustion engine for each gear position of the transmission. More specifically, in this case, a shift schedule or shift diagram (not shown) for use in shift control is corrected to shift down the transmission at an earlier time in response to an increase in the required value of the vehicle-axle torque, to thereby reduce the magnitude of the torque to be produced by the internal combustion engine to meet the torque requirement at each vehicle-speed point.

FIG. 15 is a graph showing another example where the power of the second motor/generator MG2 is reduced to be lower than a normal level. In this case, the vehicle-axle torque to be produced by the internal combustion engine at each gear position of the transmission is increased so as to compensate for the reduction in the power of the second electric motor/generator MG2. Thus, the shift schedule and the boundary lines each indicating a change in the gear ratio of the transmission are corrected toward the high vehicle-speed side than normal.

Meanwhile, it will be apparent that the above correction of the ratio of the torque regions in the torque distribution map in response to a reduction in the power of the internal combustion engine or the second motor/generator due to a failure thereof may also be performed in a drive system arranged to shift the transmission according to the vehicle speed as indicated in FIGS. 8 and 9. In this case, in the event of a decrease in the power of the internal combustion engine, the boundary lines between the regions B1, B2, B3 are wholly shifted toward the high vehicle-speed side, and/or the heights of these regions are lowered, such that the decrease in the power of the internal combustion engine is compensated for by the second electric motor/generator MG2.

While the invention has been described in detail with reference to preferred embodiments thereof, it is to be understood that the invention is not limited to the preferred embodiments or constructions, but may be otherwise embodied with various changes, modifications or improvements, without departing from the scope of the invention.

What is claimed is:

1. A hybrid-vehicle drive system, comprising:
an internal combustion engine that includes an output shaft;
a first electric motor/generator connected to the output shaft of the internal combustion engine via a power distribution mechanism;
a wheel drive shaft connected to the output shaft of the internal combustion engine via the power distribution mechanism;
a second electric motor/generator connected to the wheel drive shaft;
a transmission located on a connecting portion of the second electric motor/generator with the wheel drive shaft, wherein the transmission has a plurality of forward-drive gear positions and a reverse-drive gear position; and
a controller that selects a reverse driving mode from a first mode in which the transmission is placed in the reverse-drive gear position and a second mode in which the power distribution mechanism is adjusted to drive the vehicle in a reverse direction.

2. A method of operating a hybrid-vehicle drive system comprising: (a) an internal combustion engine that includes an output shaft; (b) a first electric motor/generator connected to the output shaft of the internal combustion engine via a power distribution mechanism; (c) a wheel drive shaft connected to the output shaft of the internal combustion engine via the power distribution mechanism; (d) a second electric motor/generator connected to the wheel drive shaft; and (e) a transmission located on the wheel drive shaft, the method comprising the steps of:
setting a gear position of the transmission to a first gear position having a predetermined high-speed gear ratio as a first gear ratio; and
maintaining the transmission in the first gear position irrespective of changes in a vehicle speed, as long as the hybrid-vehicle drive system is able to provide a required value of a torque at vehicle axles while the internal combustion engine is operated at a high fuel efficiency.

3. The method according to claim 2, wherein the transmission is set and maintained in a second gear position having a second gear ratio that is larger by one level than the first gear ratio, irrespective of changes in the vehicle speed, as long as the hybrid-vehicle drive system is able to provide the required value of the torque at the vehicle axles but not if the transmission is placed in the first gear position.

4. The method according to claim 3, wherein the transmission is set and maintained in a third gear position having a third gear ratio that is larger by one level than the second gear ratio, irrespective of changes in the vehicle speed, as long as the hybrid-vehicle drive system is able to provide the required value of the torque at the vehicle axles but not if the transmission is placed in the second gear position.

5. The method according to claim 2, wherein shifting of the transmission from one gear position to another gear position is inhibited for a predetermined period of time after the transmission is shifted to said one gear position.

6. The method according to claim 2, wherein the hybrid-vehicle drive system provides a required value of torque at vehicle axles by changing a power of at least one of the first and second electric motor/generators, instead of changing a gear position of the transmission, for a predetermined period of time.

7. The method according to claim 2, wherein:
the hybrid-vehicle drive system is selectively placed in one of a normal operating mode and a sporty operating mode; and
when the hybrid-vehicle drive system is placed in the sporty operating mode, a control operation to keep the transmission in a predetermined high-speed gear position is cancelled irrespective of changes in vehicle speed.

8. A method of operating a hybrid-vehicle drive system including: (a) an internal combustion engine that includes an output shaft; (b) a first electric motor/generator connected to the output shaft of the internal combustion engine via a power distribution mechanism; (c) a wheel drive shaft connected to the output shaft of the internal combustion engine via the power distribution mechanism; (d) a second electric motor/generator connected to the wheel drive shaft; and (e) a transmission located on at least one of the wheel drive shaft and a connecting portion of the second electric motor/generator with the wheel drive shaft, the method comprising:
changing a ratio of a first torque produced at vehicle axles by the internal combustion engine to a second torque produced at the vehicle axles by the second electric motor/generator at each gear position of the transmission to a fault ratio of the first torque to the second torque when one of the internal combustion engine and the second electric motor/generator is faulty, from a normal ratio of the first torque to the second torque when both of the internal combustion engine and the second electric motor/generator operate normally.

9. The method according to claim 8, wherein the ratio of the torque produced by the internal combustion engine to the torque produced by the second electric motor/generator, when viewed in a coordinate system representing a relationship between a vehicle speed and the torque, is changed in accordance with gear-position regions into which an operable region defined by the vehicle speed and the torque is divided by boundary lines that extend in parallel with a vehicle-speed axis of the coordinate system.

10. The method according to claim 9, wherein the ratio of the torque produced by the internal combustion engine to the torque produced by the second electric motor/generator, when viewed in the vehicle-speed versus torque coordinate system, is changed by moving the boundary lines in a direction parallel with a torque axis of the coordinate system, when one of the internal combustion engine and the second electric motor/generator is faulty.

11. A hybrid-vehicle drive system, comprising:
an internal combustion engine that includes an output shaft;
a first electric motor/generator connected to the output shaft of the internal combustion engine via a power distribution mechanism;
a wheel drive shaft connected to the output shaft of the internal combustion engine via the power distribution mechanism;
a second electric motor/generator connected to the wheel drive shaft;
a transmission located on at least one of the wheel drive shaft and a connecting portion of the second electric motor/generator with the wheel drive shaft, the transmission having a plurality of forward-drive gear positions and a reverse-drive gear position, the reverse-drive gear position being established through engagement or disengagement of an engaging device provided in the transmission, the transmission including a planetary gear mechanism having a sun gear, a ring gear, planetary pinions and a carrier; and
a controller that selects a reverse driving mode from a first mode in which the transmission is placed in the reverse-drive gear position and a second mode in which the power distribution mechanism is adjusted to drive the vehicle in a reverse direction.

12. The hybrid-vehicle drive system according to claim 11, wherein the transmission is located at the wheel drive shaft on one side of the connecting portion of the second electric motor/generator which is closer to the internal combustion engine.

13. The hybrid-vehicle drive system according to claim 11, wherein the transmission is located at the wheel drive shaft on one side of the connecting portion of the second electric motor/generator which is remote from the internal combustion engine.

14. A hybrid-vehicle drive system, comprising:
an internal combustion engine that includes an output shaft;
a first electric motor/generator connected to the output shaft of the internal combustion engine via a power distribution mechanism;
a wheel drive shaft connected to the output shaft of the internal combustion engine via the power distribution mechanism;
a second electric motor/generator connected to the wheel drive shaft;
a transmission located on at least one of the wheel drive shaft and a connecting portion of the second electric motor/generator with the wheel drive shaft, the transmission having a plurality of forward-drive gear positions and a reverse-drive gear position; and
a controller that selects a reverse driving mode from a first mode in which the transmission is placed in the reverse-drive gear position and a second mode in which the power distribution mechanism is adjusted to drive the vehicle in a reverse direction.

15. The hybrid-vehicle drive system according to claim 14, wherein the transmission is located at the wheel drive shaft on one side of the connecting portion of the second electric motor/generator which is closer to the internal combustion engine.

16. The hybrid-vehicle drive system according to claim 14, wherein the transmission is located at the wheel drive shaft on one side of the connecting portion of the second electric motor/generator which is remote from the internal combustion engine.

17. A hybrid-vehicle drive system, comprising:
an internal combustion engine that includes an output shaft;
a first electric motor/generator connected to the output shaft of the internal combustion engine via a power distribution mechanism;
a wheel drive shaft connected to the output shaft of the internal combustion engine via the power distribution mechanism;
a second electric motor/generator connected to the wheel drive shaft;
a transmission located on a connecting line or path between the second electric motor/generator and the wheel drive shaft, wherein the transmission has a plurality of forward-drive gear positions and a reverse-drive gear position; and
a controller that selects a reverse driving mode from a first mode in which the transmission is placed in the reverse-drive gear position and a second mode in which the power distribution mechanism is adjusted to drive the vehicle in a reverse direction.

18. A method of operating a hybrid-vehicle drive system including: (a) an internal combustion engine that includes an output shaft; (b) a first electric motor/generator connected to the output shaft of the internal combustion engine via a single power distribution mechanism; (c) a wheel drive shaft connected to the output shaft of the internal combustion engine via the single power distribution mechanism; (d) a second electric motor/generator connected to the wheel drive shaft; and (e) a transmission located on at least one of the wheel drive shaft and a connecting portion of the second electric motor/generator with the wheel drive shaft, the method comprising:
mutually compensating by the transmission an engine torque by the internal combustion engine and a motor torque by the second electric motor/generator, the engine and motor torques produced at vehicle axles at each gear position of the transmission when one of the internal combustion engine and the second electric motor/generator is faulty.

19. A hybrid-vehicle drive system comprising:
an internal combustion engine that includes an output shaft;
a first electric motor/generator connected to the output shaft of the internal combustion engine via a power distribution mechanism;
a wheel drive shaft connected to the output shaft of the internal combustion engine via the power distribution mechanism;
a second electric motor/generator connected to the wheel drive shaft; and
a transmission located on the wheel drive shaft, wherein
a gear position of the transmission is set to a first gear position having a predetermined high-speed gear ratio as a first gear ratio; and
the transmission is maintained in the first gear position irrespective of changes in a vehicle speed, as long as the hybrid-vehicle drive system is able to provide a required value of a torque at vehicle axles while the internal combustion engine is operated at a high fuel efficiency.

20. The hybrid-vehicle drive system according to claim 19, wherein
the transmission is set and maintained in a second gear position having a second gear ratio that is larger by one level than the first gear ratio, irrespective of changes in the vehicle speed, as long as the hybrid-vehicle drive system is able to provide the required value of the torque at the vehicle axles but not if the transmission is placed in the first gear position.

21. The hybrid-vehicle drive system according to claim 20, wherein
the transmission is set and maintained in a third gear position having a third gear ratio that is larger by one level than the second gear ratio, irrespective of changes in the vehicle speed, as long as the hybrid-vehicle drive system is able to provide the required value of the torque at the vehicle axles but not if the transmission is placed in the second gear position.

22. The hybrid-vehicle drive system according to claim 19, wherein
shifting of the transmission from one gear position to another gear position is inhibited for a predetermined period of time after the transmission is shifted to said one gear position.

23. The hybrid-vehicle drive system according to claim 19, wherein
the hybrid-vehicle drive system provides a required value of torque at the vehicle axles by changing a power of at least one of the first and second electric motor/generators, instead of changing a gear position of the transmission, for a predetermined period of time.

24. The hybrid-vehicle drive system according to claim 19, wherein
the hybrid-vehicle drive system is selectively placed in one of a normal operating mode and a sporty operating mode, and when the hybrid-vehicle drive system is placed in the sporty operating mode, a control operation to maintain the transmission in the predetermined high-speed gear position is cancelled irrespective of changes in vehicle speed.

25. A hybrid-vehicle drive system comprising:
an internal combustion engine that includes an output shaft
a first electric motor/generator connected to the output shaft of the internal combustion engine via a power distribution mechanism;
a wheel drive shaft connected to the output shaft of the internal combustion engine via the power distribution mechanism;
a second electric motor/generator connected to the wheel drive shaft; and
a transmission located on at least one of the wheel drive shaft and a connecting portion of the second electric motor/generator with the wheel drive shaft, wherein
a ratio of a first torque produced at vehicle axles by the internal combustion engine to a second torque produced at the vehicle axles by the second electric motor/generator at each gear position of the transmission is changed when one of the internal combustion engine and the second electric motor/generator is faulty, from the ratio of the first torque to the second torque when both of the internal combustion engine and the second electric motor/generator operates normally.

26. The hybrid-vehicle drive system according to claim 25, wherein
the ratio of the first torque produced by the internal combustion engine to the second torque produced by the second electric motor/generator, when viewed in a coordinate system representing a relationship between a vehicle speed and the torque, is changed in accordance with gear-position regions into which an operable region defined by the vehicle speed and the torque is divided by boundary lines that extend in parallel with a vehicle-speed axis of the coordinate system.

27. The hybrid-vehicle drive system according to claim 26, wherein
the ratio of the first torque produced by the internal combustion engine to the second torque produced by the second electric motor/generator, when viewed in the vehicle-speed versus torque coordinate system, is changed by moving the boundary lines in a direction parallel with a torque axis of the coordinate system, when one of the internal combustion engine and the second electric motor/generator is faulty.

* * * * *